(12) United States Patent
Chen et al.

(10) Patent No.: US 8,947,766 B2
(45) Date of Patent: Feb. 3, 2015

(54) TUNABLE OPTICAL FREQUENCY COMB GENERATOR

(71) Applicant: Alcatel-Lucent USA, Inc., Murray Hill, NJ (US)

(72) Inventors: Long L. Chen, Matawan, NJ (US); Christopher R. Doerr, Middletown, NJ (US); Nicolas Dupuis, New York, NY (US)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 14/269,673

(22) Filed: May 5, 2014

(65) Prior Publication Data

US 2014/0301695 A1 Oct. 9, 2014

Related U.S. Application Data

(62) Division of application No. 13/043,145, filed on Mar. 8, 2011, now Pat. No. 8,760,752.

(60) Provisional application No. 61/450,034, filed on Mar. 7, 2011.

(51) Int. Cl.
*G02F 1/35* (2006.01)
*G02F 1/035* (2006.01)
*G02F 1/225* (2006.01)

(52) U.S. Cl.
CPC ...................................... *G02F 1/225* (2013.01)
USPC ............... 359/328; 359/326; 385/3; 398/188; 398/198

(58) Field of Classification Search
USPC ........... 385/1–3; 359/326–332; 398/183, 186, 398/188, 198
See application file for complete search history.

(56) References Cited

U.S. PATENT DOCUMENTS

| | | | |
|---|---|---|---|
| 5,745,273 A | 4/1998 | Jopson | |
| 7,116,460 B2 * | 10/2006 | Griffin | 359/245 |
| 7,603,007 B2 * | 10/2009 | Terahara et al. | 385/24 |
| 7,876,491 B2 * | 1/2011 | Ide et al. | 359/279 |
| 8,582,981 B2 * | 11/2013 | Akiyama et al. | 398/188 |
| 8,760,752 B2 * | 6/2014 | Chen et al. | 359/328 |
| 2008/0187324 A1 | 8/2008 | Akiyama et al. | |

FOREIGN PATENT DOCUMENTS

| | | |
|---|---|---|
| CN | 1191428 A | 8/1998 |
| CN | 101322290 A | 12/2008 |
| CN | 101401032 A | 4/2009 |
| EP | 1209780 A2 | 5/2002 |
| JP | 3727529 B2 | 12/2005 |

OTHER PUBLICATIONS

Pataca, D., et al., "Optical Frequency Comb Generator for Coherent WDM System in Tb/s Applications," 2011 SBMO/IEEE MTT-S International Microwave & Optoelectronics Conference (IMOC), Oct. 29, 2011-Nov. 1, 2011, pp. 30-34.

(Continued)

*Primary Examiner* — Daniel Petkovsek
(74) *Attorney, Agent, or Firm* — Hitt Gaines PC

(57) ABSTRACT

An optical device comprising a tunable optical frequency comb generator. The comb generator includes an interferometer, and an optical feed-back loop waveguide.

17 Claims, 6 Drawing Sheets

(56) References Cited

OTHER PUBLICATIONS

Foreign Communication From a Related Counterpart Application, European Application No. 12755638.9, Extended European Search Report dated Sep. 4, 2014, 9 pages.

Foreign Communication from a Related Counterpart Application; Chinese Application No. 201280012353.2; Translation of Search Report dated Sep. 18, 2014; 2 pages.

* cited by examiner

TUNABLE OPTICAL FREQUENCY COMB GENERATOR

CROSS-REFERENCE TO RELATED APPLICATIONS

This application is a Divisional of U.S. application Ser. No. 13/043,145 filed on Mar. 8, 2011 to Long L. Chen, et al. entitled "TUNABLE OPTICAL FREQUENCY COMB GENERATOR," currently allowed; which application claims the benefit of U.S. Provisional Application Ser. No. 61/450,034, filed by Long L. Chen, et al. on Mar. 7, 2011, entitled "A TUNABLE OPTICAL FREQUENCY COMB GENERATOR," both commonly assigned with this application and incorporated in their entirety herein by reference.

TECHNICAL FIELD OF THE INVENTION

The present invention is directed, in general, to an optical apparatus and, more specifically, to an optical frequency comb generator for optical orthogonal frequency division multiplexing transmission and methods for using the same.

BACKGROUND OF THE INVENTION

This section introduces aspects that may help facilitate a better understanding of the disclosure. Accordingly, these statements are to be read in this light and are not to be understood as admissions about what is prior art or what is not prior art.

Optical orthogonal frequency division multiplexing (OFDM) is an attractive transmission format for high data rate per channels systems (e.g., 100 Gb/s and beyond) due to its high spectral efficiency and robustness against chromatic dispersion and polarization mode dispersion. In optical OFDM, the channel spacing between the subcarriers is equal to the bit rate. An optical OFDM transmitter usually comprises an optical frequency comb generator. The optical frequency comb generator may be spectrally flat and have a narrow line width, if using coherent detection optical OFDM.

SUMMARY OF THE INVENTION

One embodiment includes an optical device, comprising a tunable optical frequency comb generator. The comb generator includes an interferometer that includes an input optical coupler, for example a 2×2 input optical coupler, an output optical coupler, for example a 2×2 output optical coupler, and first and second optical waveguide arms located on a substrate, the first and second optical waveguide arms connecting respective first and second outputs of the 2×2 input optical coupler to respective first and second inputs of the 2×2 output optical coupler. The first optical waveguide arm includes a first optical phase shifter and a first optical phase modulator, and the second optical waveguide arm includes a second optical phase modulator The comb generator includes an optical feed-back loop waveguide having one end connected to a first output of the 2×2 output optical coupler and another end connected to a first input of the 2×2 input optical coupler, the optical feed-back loop waveguide including an optical amplifier. In some embodiments, the comb generator includes an electronic controller connected to drive at least one of the optical phase modulators with a periodic electrical signal.

Another embodiment is a method of use. The method comprises forming a sequence of evenly spaced optical carrier frequencies, including: transmitting an optical carrier into an input optical coupler of an interferometer. The interferometer includes an input optical coupler, for example a 2×2 input optical coupler, an output optical coupler, for example a 2×2 output optical coupler, and first and second optical waveguide arms located on a substrate, the first and second optical waveguide arms connecting respective first and second outputs of the 2×2 input optical coupler to respective first and second inputs of the 2×2 output optical coupler, wherein the first optical waveguide arm includes a first optical phase shifter and a first adjustable optical phase modulator, and the second optical waveguide arm includes a second adjustable optical phase modulator. The method comprises re-circulating a portion of the optical carrier through the interferometer via an optical feed-back loop waveguide, the optical feed-back loop waveguide having one end connected to a first output of the 2×2 output optical coupler and having another end connected to a first input of the 2×2 input optical coupler, wherein the optical feed-back loop waveguide includes an optical amplifier. The method comprises driving at least one of the optical phase modulators with a periodic electrical signal.

BRIEF DESCRIPTION OF THE DRAWINGS

The embodiments of the disclosure are best understood from the following detailed description, when read with the accompanying FIGUREs. Various features may not be drawn to scale and may be arbitrarily increased or reduced in size for clarity of discussion. Reference is now made to the following descriptions taken in conjunction with the accompanying drawings, in which.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

To make OFDM transmission protocols more flexible, having an optical frequency comb generator with the ability to tune the center wavelength and line spacing would be advantageous. Embodiments of the present disclosure include optical devices that comprise a tunable optical frequency comb generator capable of use for optical OFDM transmissions. An interferometer is used to generate optical sidebands to an optical carrier, and an optical feed-back loop waveguide is used to amplify and broaden the sidebands so that they become a sequence of evenly spaced optical carrier frequencies useable in optical OFDM.

Figure 1:
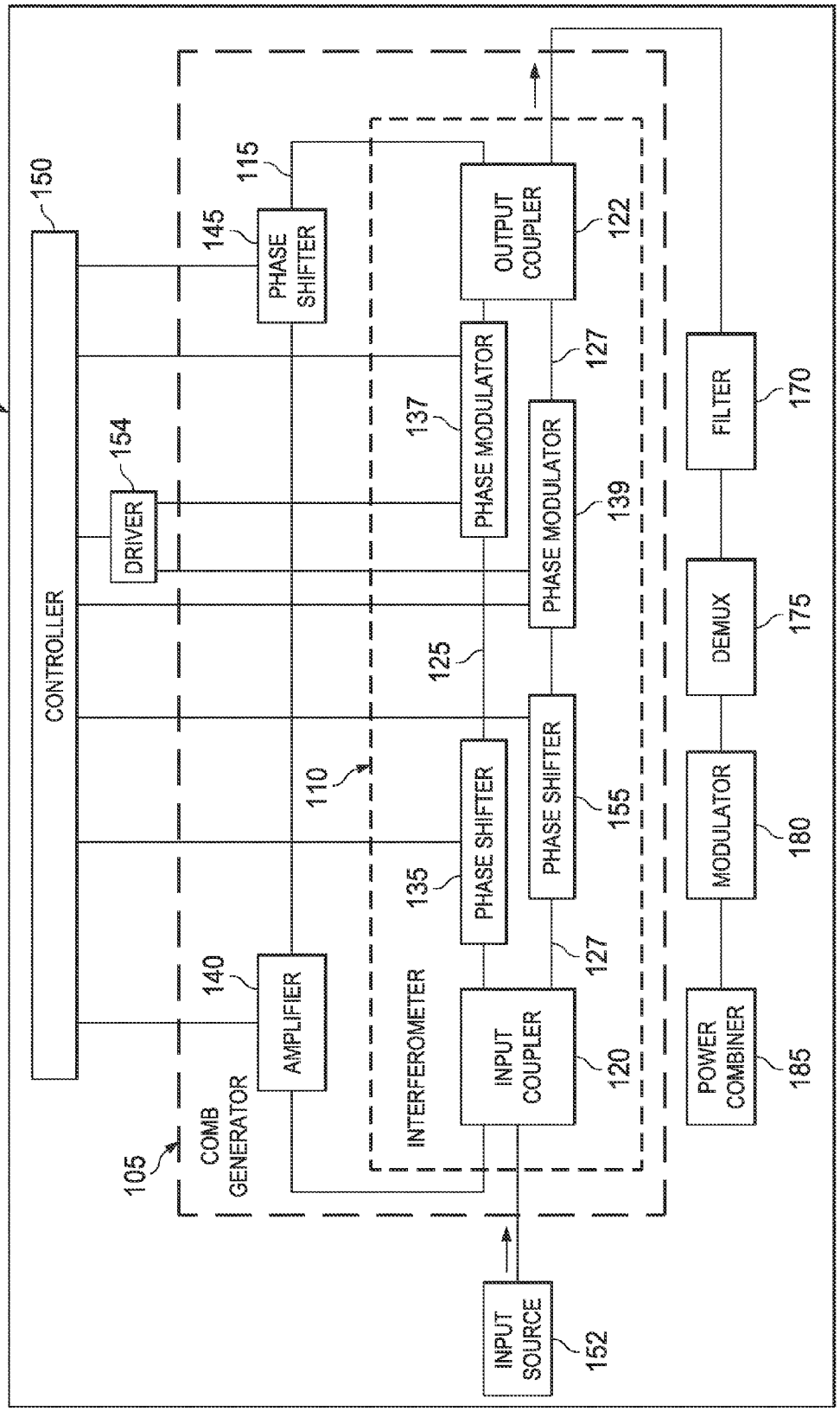
FIG. 1 presents a schematic view of an example embodiment of an device 100.

FIG. 1 presents a schematic view of an example embodiment of a device 100 (e.g., an optical device) of the disclosure. The device 100 comprises a tunable optical frequency comb generator 105. The comb generator 105 includes an interferometer 110 and an optical feed-back loop waveguide 115.

The interferometer 110 includes an input optical coupler 120, an output optical coupler 122, and first and second optical waveguide arms 125, 127 located on a substrate 130. The first and second optical waveguide arms 125, can connect the input optical coupler 120 to the output optical coupler 122. The first optical waveguide arm 125 is coupled to a first optical phase shifter 135 and to a first adjustable optical phase modulator 137 (phase mod), and the second optical waveguide arm 127 is coupled to a second adjustable optical phase modulator 139 (phase mod). The optical feed-back loop waveguide 115 includes an optical amplifier 140, and in some cases, a second optical phase shifter 145. The optical amplifier 140, and in some cases, a second optical phase shifter 145 can be optically coupled to the feed-back loop waveguide 115.

Figure 2:
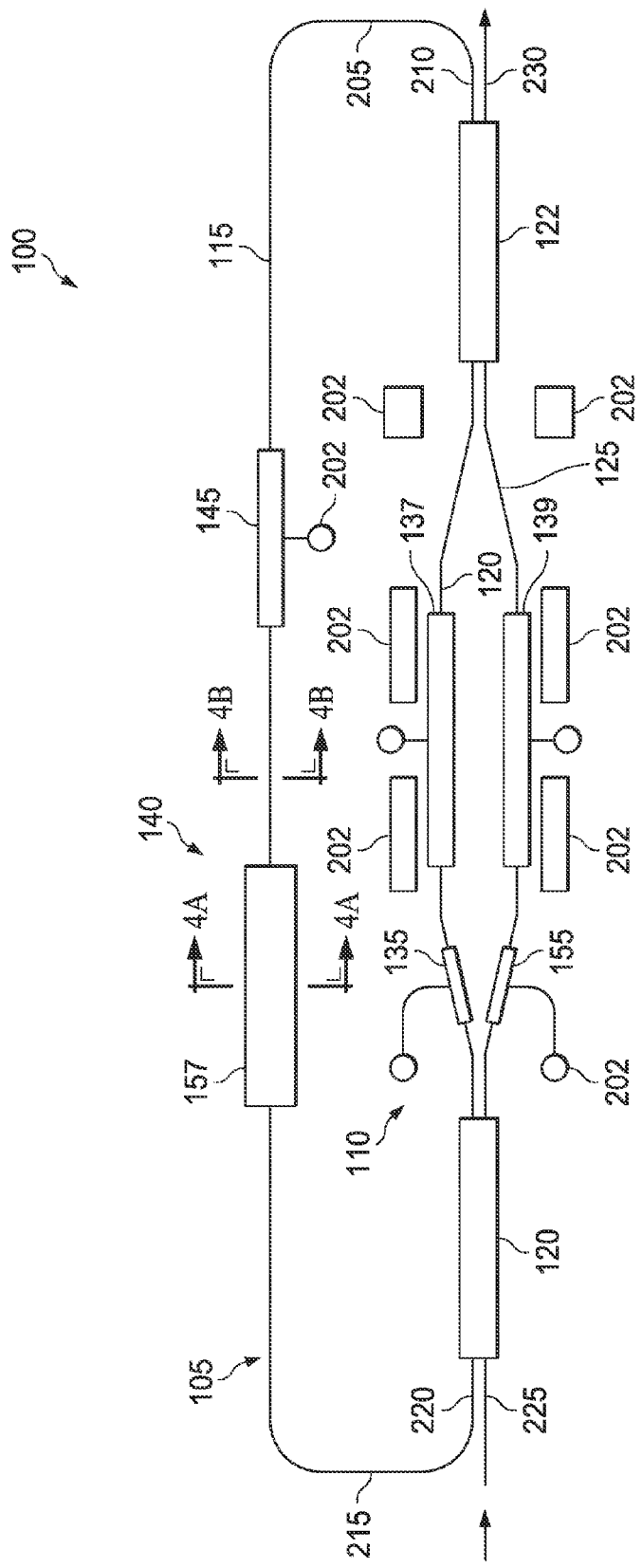
FIG. 2 presents a plan view of an example tunable frequency comb generator.

FIG. 2 presents a plan view of an example tunable frequency comb generator 105 of the disclosure. Also depicted in FIG. 2 are various electrode structures 202 that can be used to control the phase shifters 135, 145 or amplitude modulators 137, 139. The optical feed-back loop waveguide 115 has one end 205 connected to a first output 210 of the output optical coupler 122 and another end connected 215 to a first input 220 of the input optical coupler 120.

As shown in FIG. 1, some embodiments of the device 100 further include a controller 150 configured to adjust the first optical phase shifter 135 and in some cases second optical phase shifter 145 such that an input optical carrier frequency, e.g., transmitted from an input source 152 to a second input 225 (FIG. 2) of the input optical coupler 120, is suppressed by destructive interference and sidebands of the optical carrier are amplified. For instance, in some cases, the controller 150 is configured to apply a forward-biased direct current (e.g., via electrodes 202, FIG. 2) to one or both of the first optical phase shifter 135 and the second optical phase shifter 145. In some cases, the controller 150 can include, or be, an integrated circuit (e.g., an electronic integrated circuit) also located on the substrate 130. In some case the device 100 can further include a driver 154 configured to apply a periodic drive signal(s) to at least one (and sometimes both) of the amplitude modulators 137, 139. The controller 150 is configured to apply bias control voltages to the amplitude modulators 137, 139. In some cases, the controller 150 can be configured to control the periodic drive signal from the driver 154.

Figure 3:
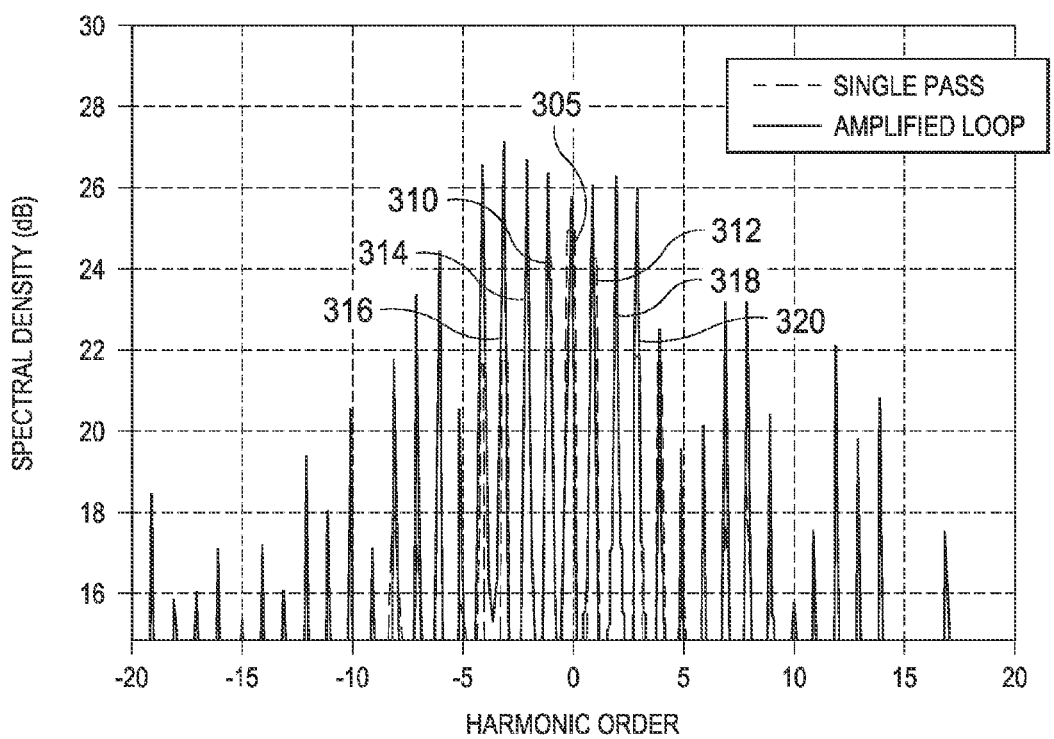
FIG. 3 present simulations of optical spectra of a tunable frequency comb generator after a single pass and multiple passes through the comb generator.

FIG. 3 present example simulations of optical spectra of the tunable frequency comb generator 105 of the disclosure after a single pass and multiple passes through the comb generator 105. After a first pass through the comb generator 105 (e.g., through the optical feed-back loop waveguide 115 and the first optical waveguide arm 125) the optical carrier frequency 305 and one or more side bands 310, 312 around the center frequency of the optical carrier frequency would be the output from the comb generator (e.g., from a second output 230 from the output optical coupler 122, FIG. 2). After multiple passes, the side bands 310 312 are modulated by one or both of the phase shifters 135, 145 such that each sideband 310, 312, in turn, will produce additional side bands 314, 316, 318, 320 until a plurality of sidebands 310-320 are produced. In the steady state, the plurality of sidebands 310-320 can serve as the desired sequence of evenly spaced optical carrier frequencies for use in optical orthogonal frequency division multiplexing. The phase shifters 135, 145 can also be controlled (e.g., via the controller 150) so as to reduce the amplitude of the optical carrier frequency 305 by destructive interference mechanisms familiar to those skilled in the art.

Based on the present disclosure, one of ordinary skill would understand how to adjust the phase shifter 135, (e.g., by trial and error) or optional phase shifters 145, 155 so as to change the relative amplitudes (e.g., the optical power) of the sidebands 310-320 such that the side bands 310-320 have approximately uniform amplitudes and thereby approximately flatten the spectral shape of the comb generator's 105 output.

As illustrated in FIG. 1, in some cases, the second optical waveguide arm 127 is coupled to a third optical phase shifter 155, so as to provide further redundant phase tuning. For instance, redundancy may be useful in the case where one phase shifter 135 or phase shifter 145 has reached a limit in phase adjustment range.

In some embodiments of the device 100 one or both of the first adjustable optical phase modulator 137 and second adjustable optical phase modulator 139 are configured to modulate an input optical carrier frequency (e.g., center band 305, FIG. 3) at a radiofrequency range to thereby generate optical sidebands (e.g., side bands 310-320, FIG. 3) that are frequency offset from the input optical carrier frequency. For example the radiofrequency modulation may be at 10 GHz in some cases. For instance, in some cases the controller 150 can be further configured to cause the application (via driver 154) of a reverse bias alternating voltage in the radiofrequency range to the first and second phase modulators 137, 139. Example embodiments of the phase modulators 137, 139 can include embodiments disclosed in application Ser. No. 13/041,976 to Christopher Doerr, ADVANCED MODULATION FORMAT USING TWO-STATE MODULATORS, filed on the same date as the present application, ("Doerr") and which is incorporated by reference herein in its entirety.

In some embodiments, the optical amplifier 140 is configured to amplify signal amplitudes (e.g., optical power) of optical sidebands (e.g., side bands 310, 312, FIG. 3) that are frequency offset from an input optical carrier frequency (e.g., center band 305, FIG. 3). In some cases, the controller 150 can be configured to control the degree of amplification that the optical amplifier 140 applies to the light passing through the optical feed-back loop waveguide 115.

Figure 4A:
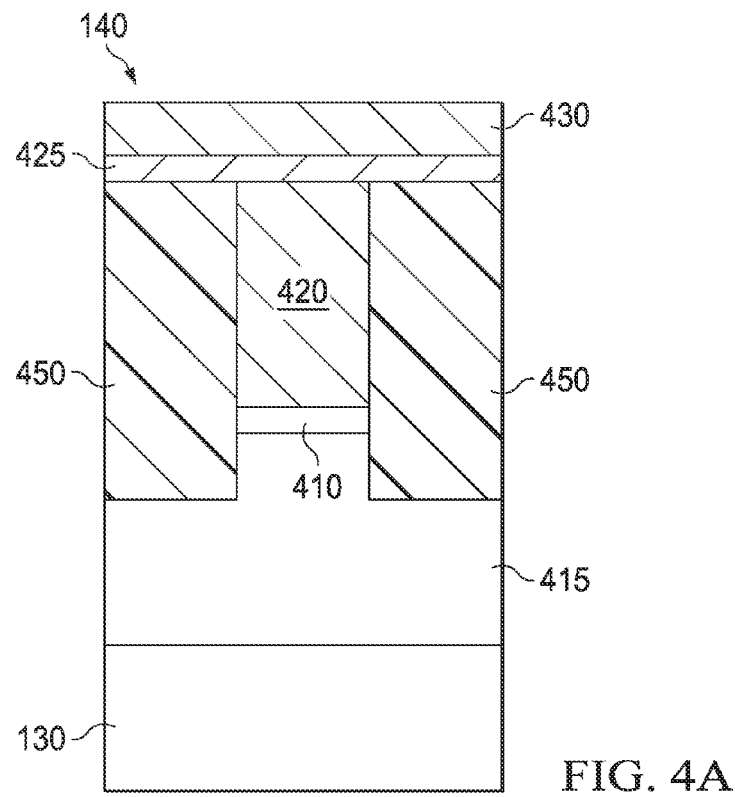
FIG. 4A presents a cross-sectional view of an active portion of an amplifier of the optical feed-back loop waveguide, corresponding to view line 3A-3A, respectively, as depicted in FIG. 2.

In some embodiments, the optical amplifier 140 can be a semiconductor optical amplifier having an active portion that can amplify the light passing through the optical feed-back loop waveguide 115 by a stimulated emission process. Selected components of an example semiconductor optical amplifier 140 are illustrated in FIG. 4A, which shows a cross-sectional view of an active portion of an amplifier 140 of the optical feed-back loop waveguide 115, corresponding to view line 4A-4A, respectively, as depicted in FIG. 2. For comparison, FIG. 4B presents a cross-sectional view of a passive portion of the optical feed-back loop waveguide 115, corresponding to view line 4B-4B, respectively, as depicted in FIG. 2.

The optical amplifier 140 can include an active layer 410 having one or more quantum well layers (e.g., one or more GaInAsP layers) sandwiched between III-V compound semiconductor barrier layers (e.g., GaInAsP layers having e.g., a larger band gap that the quantum well layers), such as set forth in "Doerr." The active layer 410 can be located on the substrate 130 which includes an n-doped III-V compound semiconductor material layer (e.g., an n-doped InP cladding layer 415 doped at $10^{18}$ cm-3), and the active layer 410 can be covered by a p-doped III-V compound semiconductor cladding layer 420 (e.g., p-doped InP cladding layer) doped at $5 \times 10^{17}$ cm-3 and 1.7 microns thick The active portion can include an electrode contact layer 425 (e.g., a GaInAs ternary contact layer) and include an electrode layer 430 (e.g., silver, gold or other metal layer).

Figure 4B:
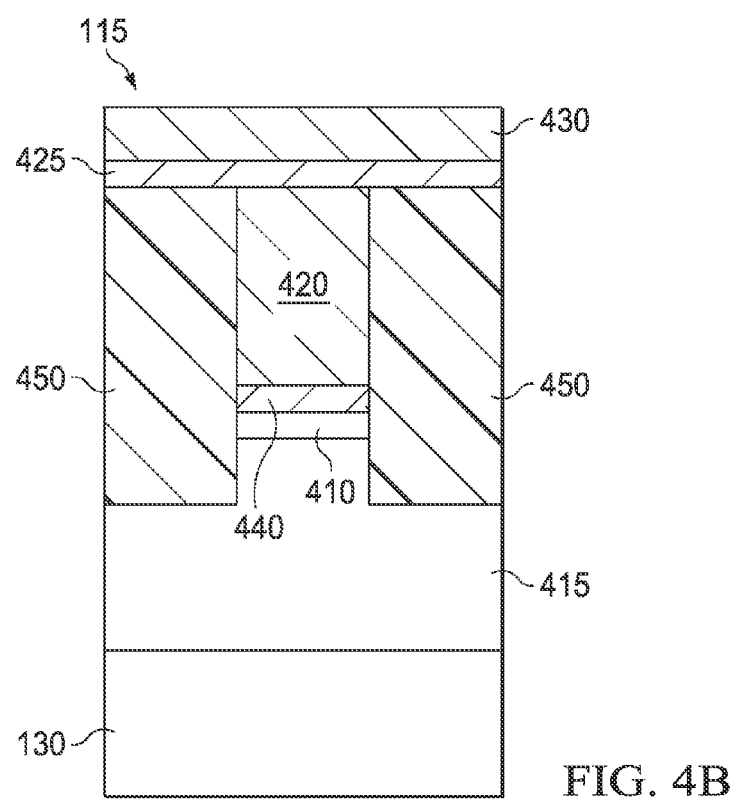
FIG. 4B presents a cross-sectional view of a passive portion of the optical feed-back loop waveguide, corresponding to view line 3B-3B, respectively, as depicted in FIG. 2.

In some embodiments, as shown in FIG. 4B, the passive portion can include all of the above described III-V compound semiconductor layers and an additional intrinsic III-V compound semiconductor layer 440 (e.g., intrinsic InP layer) to reduce optical losses in the p-doped InP. In some cases, to facilitate reducing such optical losses, the additional intrinsic III-V compound semiconductor layer 440 can have a thickness of about 200 nm.

Based on the present disclosure, one skilled in the art would understand how to apply a voltage (e.g., via controller 150) to the active portion to excite carriers in the quantum wells in the active layer 410 and thereby electrically causing the carrier pumping to enable amplifying the input light, by a stimulated emission process in which an inverted population of carriers is de-excited, resulting in photon emission.

In some embodiments, the interferometer 110 is configured as a Mach-Zehnder interferometer (MZI). For instance the interferometer can be a push-pull type MZI.

In some embodiments, the input optical coupler 120 and the output optical coupler 122 can be configured as 2×2 couplers, and in some cases 2×2 multimode interference couplers.

In some embodiments, the input source 152 can be configured as a continuous waveform (CW) laser. Using a CW laser can advantageously provide an optical carrier with a very narrow linewidth input signal, e.g., with substantially all of the amplitude of the signal is at a single wavelength (e.g., ±1 nm). For instance, in some cases a line width for the input laser source 152 is 100 kHz.

As further illustrated in FIG. 1, the optical device 100 can further include additional optical components such as a filter 170, a demultiplexer 175 (demux), a modulator array 180, a power combiner 185, and other components familiar to those skilled in the art. In some cases, these optical components can also be integrated on the substrate 130 to form a photonic integrated circuit device 100, while in other cases one or more components may not be so integrated.

Figure 5:
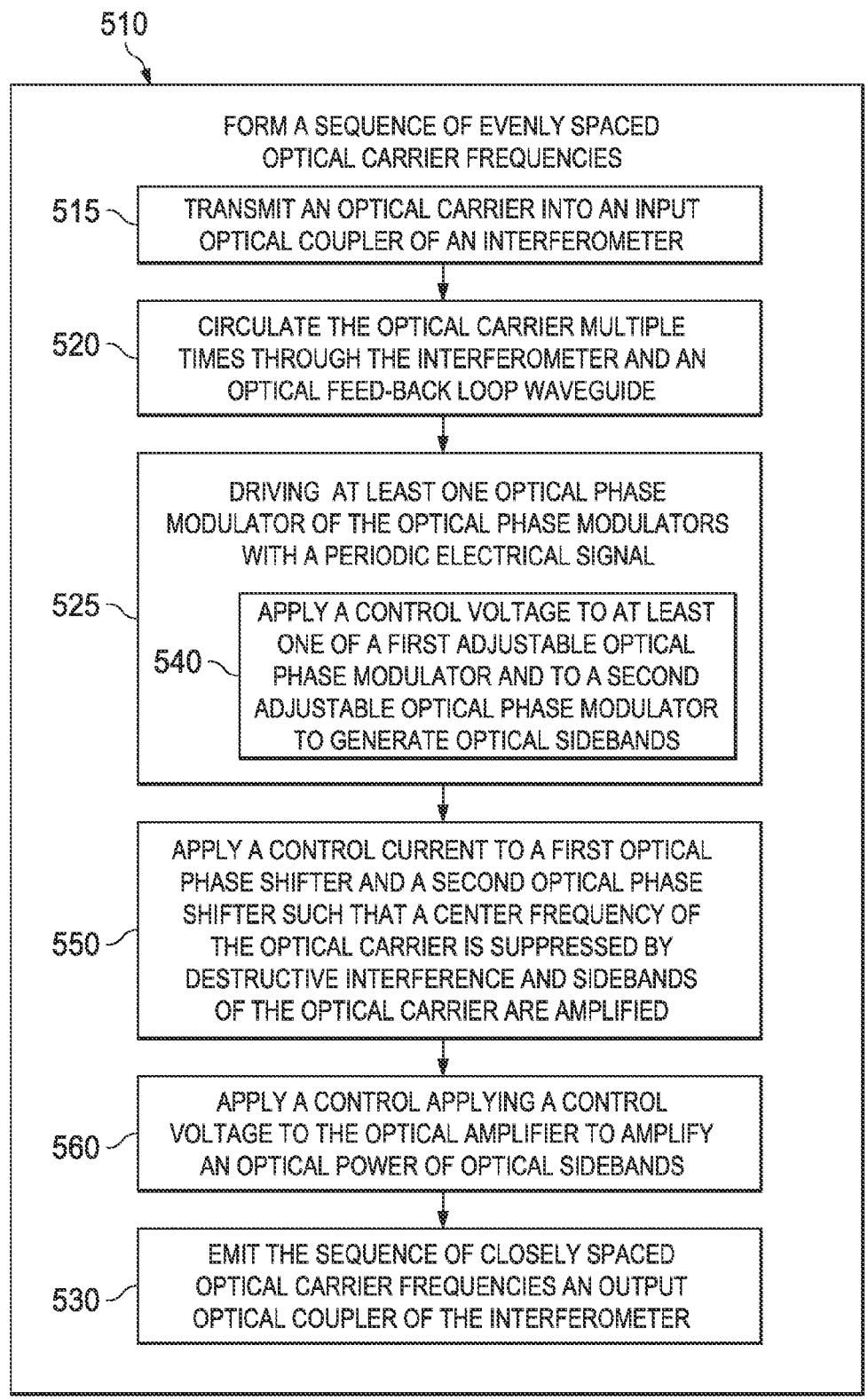
FIG. 5 presents a flow diagram illustrating an example method, e.g., a method using any the devices discussed in the context of FIGS. 1-4B.

Another embodiment is a method of use. FIG. 5 presents a flow diagram illustrating an example method of use of the disclosure, e.g., a method using any the device discussed in the context of FIGS. 1-4B.

With continuing reference to FIGS. 1-3 throughout, the method includes a step 510 of forming a sequence of evenly spaced optical carrier frequencies (e.g., sidebands 310-320). Forming the sequence of evenly spaced optical carrier frequencies (step 510), includes a step 515 of transmitting an optical carrier (e.g., center band 305) into an input optical coupler 120 of an interferometer 110. In some embodiments, the optical carrier can be signal free, or in other cases, can include an analog or a digital signal stream that is modulated (e.g., up-converted) onto optical wavelengths (e.g., about 1300 to 1700 nm) such as commonly used in optical communication systems. However, the optical carrier could have other wavelengths of light, and, could have information encoded in various fashions well-known to those skilled in the art, e.g., various modulation methods useful for optical OFDM communications, PSK, ON/Off keying, and/or polarization multiplexing. The interferometer 110 can include any of the components, including one optical phase modulator 137, 139, and have any of configurations, discussed in the context of FIGS. 1-4B or in the example embodiments discussed elsewhere herein.

Forming the sequence of evenly spaced optical carrier frequencies (step 510), also includes a step 520 of circulating the optical carrier multiple times through the interferometer 110 and an optical feed-back loop waveguide 115. The optical feed-back loop waveguide 115 can include any of the components and have any of configurations discussed in the context of FIGS. 1-4 or in the example embodiments discussed elsewhere herein.

Forming the sequence of evenly spaced optical carrier frequencies (step 510) also includes a step 525 of driving at least one optical phase modulator 137, 139 of the interferometer 110 with a periodic electrical signal.

In some embodiments of the method, the sequence of approximately evenly spaced optical carrier frequencies is emitted, in step 530, from the output optical coupler 122 of the interferometer 110 (e.g., the second output 230).

In some embodiments, the method driving with the periodic electrical signal (step 525) includes a step 540 of applying a control voltage (e.g., a reverse bias alternating voltage in the radiofrequency range, e.g., applied via the driver 154, and, controlled by the controller 150 in some cases) to at least one of the first adjustable optical phase modulator 137, and the second adjustable optical phase modulator 139, to modulate at a radiofrequency range, the optical carrier. This results in the generation of optical sidebands (e.g., side bands 310-320) that are offset from a center frequency (e.g., center band 305) of the optical carrier.

In some embodiments, the method further includes a step 550 of applying a control current (e.g., a forward bias direct current in some cases, applied via the controller 150 in some cases) to the first optical phase shifter 135 and the second optical phase shifter 145 such that a center frequency of the optical carrier (e.g., center band 305) is suppressed by destructive interference and sidebands of the optical carrier are amplified (e.g., side bands 310-320). For example, in some cases the current applied to the first and second phase shifters 135, 145 are sinusoidally driven in quadrature. Analogous control currents are applied to the third optical phase shifter 155 as part of step 550.

In some embodiments, the method further includes a step 560 of applying a control voltage to the optical amplifier 140 (e.g., a pumping voltage applied via the controller 150 in some cases) to produce amplification of an optical power of optical sidebands (e.g., side bands 310-320) that are frequency offset from a center frequency (e.g., center band 305) of the optical carrier.

EXAMPLE EMBODIMENTS

To demonstrate the disclosed comb generator's 105 use or optical OFDM transmissions, e.g., in the optical telecommunication C-band or L-band, an optical device 100 configured as a photonic integrated circuit was constructed according to the principles of the disclosure. The device 100 used a MZI 110 driven in quadrature to generate the sidebands with an amplified optical feed-back loop 115 to facilitate broadening of the spectrum. As discussed below, the example device 100 could be advantageously be operated using a low voltage sinusoidal driver, and the center wavelength and comb spacing can be adjustable over a broad optical wavelength range.

The example embodiment of the tunable frequency comb generator 105 was fabricated on an InP substrate 130 and a single GaInAsP quantum-well active layer 410. Aspects of the example PIC device 100 that includes the tunable frequency comb generator 105 are shown in FIGS. 1 and 2. The PIC device 100 includes a MZI 110 with a reverse-biased alternating voltage phase-modulators 137, 139 and a forward-biased direct current phase shifters 135, 155 in each arm 125, 127. The two phase modulators 137, 139 can be sinusoidally driven in quadrature to generate the sidebands. The MZI 110 included two 2×2 multimode interference (MMI) couplers 120, 122. To enhance the phase modulation, one output 210 of the MZI 110 was amplified and connected back to one input 220, i.e., to form an optical feedback loop 115. The optical feed-back loop 115 also integrated a phase shifter 145 for fine tuning of the phase of the optical feed-back loop 115. The optical feed-back loop's 115 length was about 3.8 mm.

To facilitate obtaining a large phase change, an asymmetric 3-step planar quantum well (QW) structure, familiar to those skilled in the art, for the phase modulators 137, 139 was used. For example, GaInAsP—InP three-step quantum wells, similar to that described in: H. Mohseni, H. An, Z. A. Shellenbarger, M. H. Kwakernaak, and J. H. Abeles, "Enhanced electro-optic effect in GaInAsP—InP three-step quantum wells," Appl. Phys. Lett. 84, 1823-1825 (2004), which is incorporated by reference in its entirety, was used. The example asymmetric 3-step planar quantum well were lattice matched to InP and the active layers were undoped. An example asymmetric 3-step planar quantum well compositions can comprise: 1) barrier layer (B): Ga0.093:In0.907:As0.206:P0.734; L=9 nm; Eghh=1.2 eV (1033 nm); 2) quantum well layer 1 (QW1): Ga0.468:In0.532:As; L=3 nm; Eghh=0.75 eV (1653 nm); 3) quantum well layer 2 (QW2): Ga0.413:In0.587:As0.892:P0.108; L=3 nm; Eghh=0.8 eV (1550 nm); 4) quantum well layer 3 (QW3): Ga0.368:In0.632:As0.795:P0.205; L=3 nm; Eghh=0.85 eV (1459 nm). In some cases, an example active layer 410 can comprise a stack of 10 periods of the above sequence of layers, B/QW1-QW2-QW3, to provide a total thickness of about 189 nm. In some cases, such a stack can result in a fundamental transition E1-HH1 equal to 0.83859 eV (1478 nm).

As discussed above FIG. 3 presents a representative calculation of the comb generator's output for a single-pass (i.e., no optical feedback loop) and for multiple passes though the optical feed-back loop waveguide 115 with amplification of the sidebands 310-320. The modulator response was calculated assuming a GaInAsP 3-step quantum well structure with ten quantum well layers interleaved with eleven barrier layers.

Calculating the modulator response included calculating the absorption coefficient with a transfer matrix method, familiar to those skilled in the art, and deducing the phase change from Kramers-Kronig integrals. The transfer function of the PIC device 100 was then calculated assuming a gain of 0 dB for the amplifier 140 since we did not integrate the losses of the waveguides 115, 125, 127 and the 2×2 couplers 120, 122 into the calculations. As shown in the figure, the optical feed-back loop 115 enables the generation of many additional lines due to the multiple passes through the MZI 110. It should be noted that the comb flatness was not optimized via adjustment of the phase shifters in the simulation, however, such optimization would be easily understood from the present disclosure by persons or ordinary skill in the relevant arts.

The active layers 410 were grown by a low-pressure metal-organic vapor phase epitaxy (MOVPE) process, familiar to those skilled in the art. To integrate the phase modulators 137, 139 and semiconductor optical amplifier 140 fabrication in a single epitaxial growth step, we used a selective area growth (SAG) process, familiar to those skilled in the art. As part of the SAG process, a SAG mask was designed to red-shift the bandgap of the semiconductor optical amplifier 140 about 80 nm from the band edge of the modulator 137. In one embodiment, an about 2 micron InP:n buffer layer 130 was grown, and then an about 300 nm $SiO_2$ mask 450 (FIG. 4A, 4B) was deposited and the SAG mask was patterned. This was followed by selectively growing an about 190 nm lattice-matched multiple 3-step quantum wells embedded by an about 200 nm intrinsic InP layer (InP:i) to reduce the waveguide losses. After etching-off the InP:i layer on top of the phase modulators 137, 139, the semiconductor optical amplifier 140 and phase shifters 135, 145, 155, an about 1.7 micron thick InP:p upper cladding 420 was grown, followed by a GaInAs ternary electrode contact layer 425. The electrode layer 430 can comprise physical vapor deposited silver.

The photoluminescence peak of the active layer 410 is at an energy corresponding to a wavelength of light of equal to about 1470 nm. A waveguide structure was fabricated similar to that described in U.S. patent application Ser. No. 11/651,824 filed January, 2007, to Christopher Doerr, "Compact Optical Modulator," or C. R. Doerr, L. Zhang, P. J. Winzer, J. H. Sinsky, A. L. Adamiecki, N. J. Sauer, and G. Raybon, "Compact High-Speed InP DQPSK Modulator," IEEE Photon. Technol. Lett. 19, 1184-1186 (2007), both of which are incorporated by reference in its entirety. The layer stack for active and passive portions of the example PIC device 100 are presented in FIG. 4A and FIG. 4B, respectively. The modulator's 137, 139 lengths were about 550 microns and the semiconductor optical amplifier's 140 length was about 500 microns.

Experiments were performed at room temperature and the example PIC device 100 was accessed optically via lensed fibers and electrically via high-speed probes with internal about 50 ohm termination for the modulators 137, 139 and single-needle DC probes for the semiconductor optical amplifier 140 and phase shifters 135, 145, 155. The waveguide loss at wavelengths much longer than the band edge was about 1 dB/mm. To form the comb spectra, we drove the MZI 110 with an RF synthesizer generating a 10 GHz sine wave followed by an about 30 dB gain RF amplifier. The signal was split with an about 3-dB RF coupler and pi/2 phase-shifter on one of the two outputs to make the quadrature. The signal was then applied to the phase modulators 137, 139 via the high-speed probes. Each phase modulator 137, 139 was driven with an about 6 V peak-to-peak and an about 4 V bias. The voltage bias of the semiconductor optical amplifier 140, and the phase shifter 135 in the upper arm 125 of the MZI 110, were also similarly controlled. The output optical spectrum was acquired with a spectrum analyzer having a resolution of about 0.01 nm.

Figure 6:
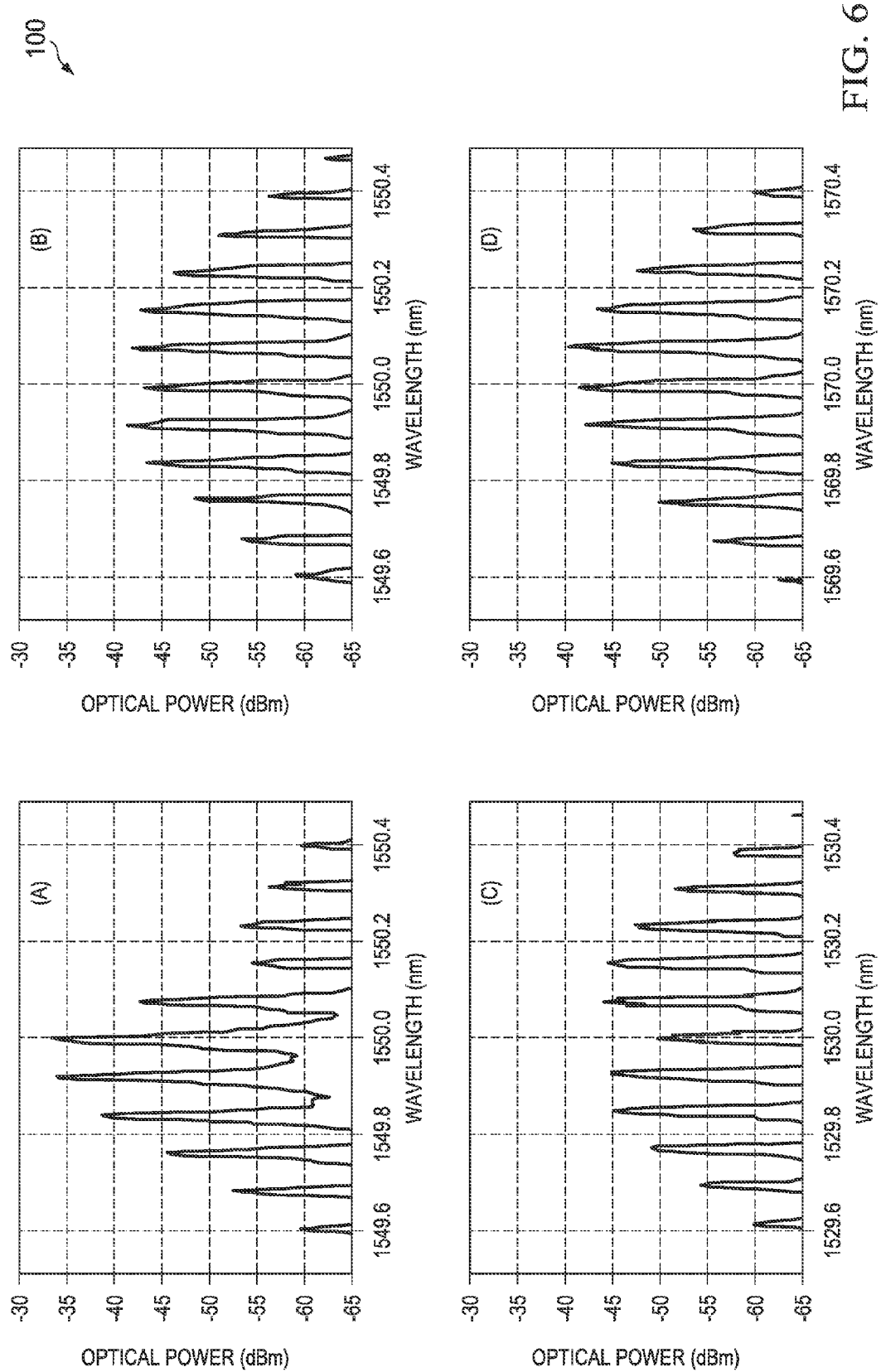
FIG. 6 presents example optical spectra from an example tunable frequency comb generator.

FIG. 6. presents example optical spectra from an example tunable frequency comb generator of the disclosure each of spectra (A)-(D) corresponding to different driving conditions and different optical carrier wavelengths. The spectra demonstrate a 5-line, 10-GHz-spaced frequency comb with 3-dB spectral flatness which was tunable over about 40 nm. FIGS.

6(A) and 6(B) show spectra when the center wavelength was set to 1550 nm, which was substantially equal to the semiconductor optical amplifier 140 maximum-gain peak. In FIG. 6A the phase shifter 135 inside the MZI 110 was adjusted to approximately maximize the output power. This configuration is substantially the same as an MZI 110 without an optical feed-back loop. The asymmetry of the spectrum may be due to the quadrature generation of the sidebands. In some cases using the phase shifter 155 in the second arm 125, causes the spectrum to be mirrored about the center wavelength. This driving condition corresponding to FIG. 6A produced only two lines in the 3-dB reduction bandwidth. FIG. 6B shows the spectrum when the phase shifter 135 inside the MZI 110 was adjusted to have light passing through the optical feed-back loop 115. The output power is smaller than in FIG. 6A due to the destructive interference at the PIC device 110 output port 230, but, the comb generator's 105 output is broadened due to the multiple passes through the optical feed-back loop 115. This result in the generation of five lines in the 3-dB reduction bandwidth. FIGS. 6C and 6D such the spectra obtained using the same driving condition as used for the configuration depicted in FIG. 6B, but at 1530 nm and 1570 nm, wavelengths respectively. These configurations still result in generating five lines in the 3-dB reduction bandwidth, demonstrating the tunability of the disclosed comb generator 105.

Although the present invention has been described in detail, those skilled in the art should understand that they can make various changes, substitutions and alterations herein without departing from the scope of the invention.

What is claimed is:

1. A method of use, comprising:
    forming a sequence of evenly spaced optical carrier frequencies, including:
        transmitting an optical carrier into an input optical coupler of an interferometer, the interferometer including:
            an input optical coupler, an output optical coupler, and first and second optical waveguide arms located on a substrate, the first and second optical waveguide arms connecting respective first and second outputs of the input optical coupler to respective first and second inputs of the output optical coupler, wherein the first optical waveguide arm includes a first optical phase shifter and a first adjustable optical phase modulator, and the second optical waveguide arm includes a second adjustable optical phase modulator;
        re-circulating a portion of the optical carrier through the interferometer via an optical feed-back loop waveguide, the optical feed-back loop waveguide having one end connected to a first output of the output optical coupler and having another end connected to a first input of the input optical coupler; and
        driving at least one of the optical phase modulators with a periodic electrical signal.

2. The method of claim 1, wherein driving with the periodic electrical signal includes applying a control voltage to at least one of the first adjustable optical phase modulator and the second adjustable optical phase modulator to thereby modulate the optical carrier at a radiofrequency range.

3. The method of claim 1, further including applying a DC control current to the first optical phase shifter and applying a DC control current to the second optical phase shifter such that a center frequency of the optical carrier is suppressed by destructive interference between the optical carrier and the re-circulating portion of the optical carrier.

4. The method of claim 1, wherein the control current applied to the first and second phase shifters include AC components that are sinusoidally driven in quadrature.

5. The method of claim 1, further including applying a control voltage to an optical amplifier to amplify an optical power of optical sidebands that are frequency offset from a center frequency of the optical carrier.

6. The method of claim 1, wherein the optical feed-back loop waveguide includes an optical amplifier.

7. The method of claim 1, wherein the optical feed-back loop waveguide includes a second optical phase shifter.

8. The method of claim 1, wherein the sequence of evenly spaced optical carrier frequencies is emitted from a second output of the output optical coupler.

9. The method of claim 1, wherein the input optical coupler is a 2×2 optical coupler and the output optical coupler is a 2×2 optical coupler.

10. The method of claim 1, further including an electronic controller configured for driving said at least one optical phase modulator by said periodic electrical signal.

11. The method of claim 10, wherein the electronic controller is configured to adjust the first optical phase shifter such that an input optical carrier frequency transmitted from an input source to a second input of the input optical coupler is suppressed by destructive interference and sidebands of the optical carrier are amplified.

12. The method of claim 10, wherein the electronic controller is configured to adjust the first optical phase shifter and second optical phase shifter such that an input optical carrier frequency transmitted from an input source to a second input of the input optical coupler is suppressed by destructive interference and sidebands of the optical carrier are amplified.

13. The method of claim 10, wherein the electronic controller is configured to apply a forward-biased direct current to one or both of the first optical phase shifter and the second optical phase shifter.

14. The method of claim 1, further including an electronic driver configured to apply the periodic electrical signal to the at least one of the optical phase modulators.

15. The method of claim 1, wherein the second optical waveguide arm includes a third optical phase shifter configured to modulate an input optical carrier frequency at a radiofrequency range.

16. The method of claim 1, wherein the optical amplifier is configured to amplify optical power of optical sidebands that are frequency offset from an input optical carrier frequency.

17. The method of claim 1, wherein the optical amplifier includes an active layer having one or more quantum well layers sandwiched between III-V separation layers, the active layer located on the substrate including an n-doped III-V material layer, and the active layer covered by a p-doped III-V cladding layer.

* * * * *